United States Patent
Watters et al.

(10) Patent No.: US 7,708,069 B2
(45) Date of Patent: May 4, 2010

(54) METHOD TO ENHANCE PROPPANT CONDUCTIVITY FROM HYDRAULICALLY FRACTURED WELLS

(75) Inventors: Jeffrey Thomas Watters, Cypress, TX (US); Mahadev Ammachathram, Spring, TX (US); Larry Thomas Watters, Spring, TX (US)

(73) Assignee: Superior Energy Services, L.L.C., New Orleans, LA (US)

( * ) Notice: Subject to any disclaimer, the term of this patent is extended or adjusted under 35 U.S.C. 154(b) by 251 days.

(21) Appl. No.: 11/782,151

(22) Filed: Jul. 24, 2007

(65) Prior Publication Data

US 2008/0196895 A1    Aug. 21, 2008

Related U.S. Application Data

(60) Provisional application No. 60/832,994, filed on Jul. 25, 2006.

(51) Int. Cl.
*E21B 43/267* (2006.01)
*C09K 8/80* (2006.01)

(52) U.S. Cl. .............. 166/280.2; 166/280.1; 166/308.3; 507/924

(58) Field of Classification Search ........................ None
See application file for complete search history.

(56) References Cited

U.S. PATENT DOCUMENTS

| | | | |
|---|---|---|---|
| 3,155,162 A * | 11/1964 | Flickinger et al. ........ | 166/280.1 |
| 3,399,727 A | 9/1968 | Graham | |
| 3,625,892 A * | 12/1971 | Watanabe ................... | 507/203 |
| 3,750,886 A | 8/1973 | Salm | |
| 4,421,167 A | 12/1983 | Erbstoesser et al. | |
| 4,462,466 A | 7/1984 | Kachnik | |
| 4,493,875 A | 1/1985 | Beck et al. | |
| 4,547,468 A * | 10/1985 | Jones et al. .................... | 501/33 |
| 4,627,495 A | 12/1986 | Harris et al. | |
| 4,654,266 A | 3/1987 | Kachnik | |
| 5,103,905 A | 4/1992 | Brannon et al. | |
| 6,330,916 B1 | 12/2001 | Rickards et al. | |
| 6,911,419 B2 | 6/2005 | Lord et al. | |
| 6,923,264 B2 | 8/2005 | Stabaugh et al. | |
| 6,945,329 B2 | 9/2005 | Harris et al. | |
| 6,949,491 B2 * | 9/2005 | Cooke, Jr. ................... | 507/219 |
| 6,966,379 B2 | 11/2005 | Chatterji et al. | |
| 6,986,392 B2 | 1/2006 | Chatterji et al. | |
| 7,044,224 B2 | 5/2006 | Nguyen | |
| 7,125,825 B2 | 10/2006 | Moss | |
| 7,207,386 B2 * | 4/2007 | Brannon et al. .......... | 166/280.2 |
| 7,210,528 B1 | 5/2007 | Brannon et al. | |
| 2005/0272613 A1 * | 12/2005 | Cooke ........................ | 507/219 |
| 2006/0065398 A1 | 3/2006 | Brannon et al. | |
| 2006/0073980 A1 | 4/2006 | Brannon et al. | |
| 2006/0175059 A1 * | 8/2006 | Sinclair et al. ............... | 166/283 |
| 2006/0177661 A1 | 8/2006 | Smith et al. | |
| 2006/0289160 A1 | 12/2006 | van Batenburg et al. | |

FOREIGN PATENT DOCUMENTS

| | | |
|---|---|---|
| EP | 1368188 | 12/2003 |
| EP | 0773343 | 5/2007 |

* cited by examiner

*Primary Examiner*—George Suchfield
(74) *Attorney, Agent, or Firm*—Garvey, Smith, Nehrbass & North, L.L.C.; Gregory C. Smith

(57) ABSTRACT

A method of mitigating proppant settling in a hydraulic fracture in order to better suspend the proppant as well as ensure a more uniform pack, by mixing a pre-determined volume percent of low density additive, such as glass beads or other suitable material, such as polylactic acid particles, into the fracturing slurry along with the standard high-density proppant, it is anticipated that density gradients can be induced inside the fracture. Upward movement of low density additive due to them having density lower than the carrier fluid will interfere with downward movement of high-density proppant and vice versa. This mutual interference between the two proppants confined in the narrow fracture will significantly hinder the settling/segregation of the high-density proppant. The low density material has a specific gravity of about 0.3, particle size distribution similar to that of standard proppant, and sufficient mechanical strength to survive fracture closure stress.

10 Claims, No Drawings

METHOD TO ENHANCE PROPPANT CONDUCTIVITY FROM HYDRAULICALLY FRACTURED WELLS

CROSS-REFERENCE TO RELATED APPLICATIONS

Priority of U.S. Provisional Patent Application Ser. No. 60/832,994, filed Jul. 25, 2006, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The method of the present invention pertains to hindered settling of proppant in vertical fractures by the addition of low density material into the fracturing slurry comprising of fracturing fluid and proppant.

2. General Background of the Invention

Hydraulic fracturing involves the creation of a crack in a reservoir to enhance hydrocarbon production. Highly viscous fluids blended with proppant or sand is injected into the crack. When the fracture closes, the proppant left in the fracture creates a large flow area and a highly conductive pathway for hydrocarbons to flow into the wellbore. The proppant or sand is utilized to maintain an open fracture. The viscous fluids are utilized to transport, suspend and eventually allow the proppant to be trapped inside the fracture. the fluids typically follow power law behavior for the range or shear rates encountered in hydraulic fracturing treatments.

Typical fluid volumes in a propped fracturing treatment can range from a few thousand to a few million gallons. Proppant volumes can approach several thousand cubic feet. The goal is to obtain uniform proppant distribution; and therefore, a uniformly conductive fracture along the wellbore height and fracture half-length. However, the complicated nature of proppant settling in non-Newtonian fluids often causes a higher concentration of proppant to settle down in the lower part of the fracture. This often leads to a lack of adequate proppant coverage on the upper portion of the fracture and the wellbore. Clustering of proppant, encapsulation, bridging and embedment are few phenomena that lower the potential conductivity of the proppant pack.

Proppant transport inside a hydraulic fracture has two components when the fracture is being generated. The horizontal component is dictated by the fluid velocity and associated streamlines which help carry proppant to the tip of the fracture. The vertical component is dictated by the terminal particle settling velocity of the particle and is a function of proppant diameter and density as well as fluid viscosity and density. The terminal settling velocity is further complicated by the various phenomena mentioned earlier.

At some point of the fracture generation process, proppant coverage reaches an equilibrium geometry, above which all the proppant injected is carried out farther into the fracture. This potentially restricts the effective propped fracture height as well as greatly increases potential for bridging during treatment.

When pumping ceases, the fracture eventually closes on the proppant pack. The fluid contains viscosity breakers that lower the apparent viscosity and aid the acceleration of fracture closure due to faster leakoff. This reduction in fluid viscosity of the static fluid leads to higher settling velocities causing more proppant to drop to the fracture bottom. The potential for voids and non-uniform packing contribute to a lower effective propped area and hence significantly lower effective wellbore radius as closure occurs.

Other inventions aimed at prevent proppant settling in a vertical fracture have focused on creating proppant with density equal to that of the carrier fluid. Thus, the proppant in the fluid would be neutrally buoyant in the fracture and stay in place vertically into the fracture closure. The methods of creating neutrally buoyant proppant includes surface-sealing of porous ceramic particles to trap air-filled voids inside the particles, creating composites of strong materials and hollow ceramic spheres, and creating hollow spheres with sufficient wall strength to withstand closure stresses.

These approaches all possess inherent drawbacks in terms of proppant durability and cost to manufacture.

BRIEF SUMMARY OF THE INVENTION

The invention described herein is a method of mitigating the above mentioned effects in order to better suspend the proppant as well as ensure a more uniform pack. By infusing an additive that has a lower density than the fluid medium, it is anticipated that density gradients can be induced inside the fracture. The additives can be any material that will tend to rise up in the fluid mass as opposed to settling down. Upward movement of low density additive will interfere with the downward movement of high density proppant and vice versa. This mutual interference between the proppants and the additive confined in the narrow fracture will significantly hinder the settling/segregation of the high-density proppant. The low density material has a specific gravity less than the carrier fluid medium, particle size distribution similar to that of standard proppant, and may or may not have sufficient mechanical strength to survive fracture closure stress. Therefore, in addition to being buoyant, this material may act as a proppant also.

It is proposed that by mixing a certain percentage of low density additive having similar mechanical properties as proppant into the fracturing slurry, more effective proppant coverage and fracture half length can be realized.

The high shear rates on the surface, tubulars and perforations would ensure a relatively homogenous mixture of proppant and low density additive in the slurry. As the slurry mixture enters the fracture, the dramatic lowering of shear rates will allow the process of proppant and low density additive migration within the fluid mass. Once pumping ceases, the inherent density gradients will tend to cause simultaneous migration of the proppant to the bottom of the fracture and the low density additive to the top of the fracture. This creates a process of bimodal hindered settling for the proppant, thereby significantly lowering the proppant settling rates. As the fracture closes on the pack, more proppant material is retained on the upper portion of the fracture.

It is expected that the percent of the low density additive that is added to the slurry would be a function of the fracture closure time. A higher quantity of low density additive would be required for low permeability formations where the time for the fracture to close on the pack may take several hours.

This process ensures more uniform proppant coverage along the height of the fracture, thus contributing to the overall effectiveness of the treatment. Due to the fact that the low density additive has similar size distribution and closure stress characteristics, the conductivity of the pack is not compromised. In fact, due to better sphericity and roundness, it is expected that the overall conductivity of the fracture would be greater than that of conventional fracturing slurries that contain only proppant

BRIEF DESCRIPTION OF THE DRAWINGS

NONE

DETAILED DESCRIPTION OF THE INVENTION

The addition of low density additive into fracturing slurry would involve accurate metering of the additive into the proppant mass. Most field scale equipment that meter solid breakers into the fracturing fluid could be potentially upgraded for the addition of low density additive. The low density particulates may or may not meet or exceed strength requirements in order to ensure minimal embedment and crushing inside the fracture.

As mentioned earlier, fracture closure time would determine the weight percent of additive to be utilized during treatment. Longer closure times typical of low permeability rocks would necessitate higher volume fractions. In addition, higher strength proppants have higher settling rates. This would also necessitate a greater low density additive fraction in order to induce more hindrance to settling. Charts can be developed as a design aid for various formation, fracturing fluid and proppant characteristics.

The following experimental data supports the utility and novelty of the method of the present invention.

Experiment 1: Cross-Linked Gel Proppant Settling Test

Static proppant settling tests were conducted in a 1-inch diameter, 5-foot long glass tube. The tube was supported vertically and plugged at the bottom. Reference marks were made throughout the length of the tube in 1-inch increments. Testing was conducted in a 25 lb/Mgal cross-linked fracturing fluid. The fluid was guar based with a borate cross-linker. The baseline fluid contained a concentration of 4-pounds per gallon of fluid (PPA) 20/40 mesh proppant. It was loaded into the tube after mixing and a timer was started. The test was left static at room temperature. The proppant/gel interface was monitored as it fell from top to bottom while the proppant settled. Two additional tests were performed under the above mentioned conditions. A low-density (SG=0.9), spherical additive was incorporated into the cross-linked gel/proppant slurry at concentrations or 1 and 2 percent by weight of proppant. Again, the proppant interface was monitored with time. Results from all three tests are summarized below in Table 3.

TABLE 3

Experiment 1 Data Summary

| Test Number | % (BWOP) Low-Density Additive | Time To Settle 18-inches (hr:min) | Time To Settle 23-inches (hr:min) | Time To Settle 25.5-inches (hr:min) |
|---|---|---|---|---|
| 1 | 0 | 2:30 | 4:00 | 5:50 |
| 2 | 1 | 3:30 | 6:50 | 8+ |
| 3 | 2 | 22:00 | 22:00+ | 22:00+ |

The above test results indicate that the low-density additive successfully hindered the proppant settling, resulting in longer times for the proppant to settle.

Experiment 2: Large-Scale, Linear Gel Proppant Settling Test

Proppant settling tests were conducted in an 8-ft tall, 2-ft wide plexiglass window, with a ½-gap between the plexiglass plates. The window had a steel-reinforced, wooden frame with four, 7/16-inch inlet holes and outlet holes, plumbed with ball valves. Metal supports were fastened across the window in 1-ft increments and were used for reference during tests. There were a total of 4 tests performed.

Test 1 and 2 were conduced in a 15 lb/Mgal guar based linear gel. The apparent viscosity of the gel was 8 cP at 511 $s^{-1}$. The linear gels for testing contained a proppant concentration of 2 PPA, 30/50 mesh. Test 1 contained no low-density additive and test 2 contained 5% by weight of proppant low-density additive. The additive used was sieved to 30/50 mesh and had a specific gravity of 0.8. The linear gel was prepared and proppant was added for a final concentration of 2 PPA. Low-density additive was added for test 2 and the slurry was blended until uniform. The slurry was then pumped through the test fixture with a 1-inch diaphragm pump until full. The pump was shut down, and all valves were closed. The proppant interface was watched and monitored with time to determine settling rates. Test data is summarized below in Table 4.

TABLE 4

Experiment 2, Test 1 and 2 Data Summary

| Time to Settle | 0% Low-Density Additive | 5% Low-Density Additive | % Increase in Time to Settle |
|---|---|---|---|
| 1 ft | 8 sec | 11 sec | 38 |
| 2 ft | 22 sec | 42 sec | 91 |
| 3 ft | 47 sec | 61 sec | 30 |
| 4 ft | 56 sec | 77 sec | 38 |

The above test results indicate that the low-density additive successfully hindered the proppant settling, resulting in longer times for the proppant to settle.

Test 3 and 4 were conduced in a 25 lb/Mgal guar based linear gel. The apparent viscosity of the gel was 16 cP at 511 $s^{-1}$. The linear gels for testing contained a proppant concentration of 2 PPA, 30/50 mesh. Test 3 contained no low-density additive and test 4 contained 5% by weight of proppant low-density additive. The additive used was sieved to 30/50 mesh and had a specific gravity of 0.8. The linear gel was prepared and proppant was added for a final concentration of 2 PPA. Low-density additive was added for test 4 and the slurry was blended until uniform. The slurry was then pumped through the test fixture with a 1-inch diaphragm pump until full. The pump was shut down, and all valves were closed. The proppant interface was watched and monitored with time to determine settling rates. Test data is summarized below in Table 5.

TABLE 5

Experiment 2, Test 3 and 4 Data Summary

| Time to Settle | 0% Low-Density Additive | 5% Low-Density Additive | % Increase in Time to Settle |
|---|---|---|---|
| 1 ft | 15 sec | 24 sec | 60 |
| 2 ft | 28 sec | 44 sec | 57 |
| 3 ft | 48 sec | 67 sec | 40 |
| 4 ft | 65 sec | 79 sec | 22 |

The above test results indicate that the low-density additive successfully hindered the proppant settling, resulting in longer times for the proppant to settle.

In summary, what is provided is a method of mitigating proppant settling in a hydraulic fracture, by providing a proppant-carrier fluid slurry; adding a low-density particulate material which defines an additive at a concentration of between 1% and 2% by weight of volume to the proppant-carrier fluid slurry, the particulate additive having a specific gravity lower than the specific gravity of the carrier fluid; providing a proppant having a specific gravity that is greater than that of the carrier fluid; injecting the proppant-carrier fluid slurry having the low-density particulate material into the fracture; due to the specific gravity gradient between the particulate material, the proppant-carrier fluid slurry, and the proppant, causing the additive particles to rise in the carrier fluid while the proppant particles fall in the carrier fluid; and through interference from collisions of the upward moving additive particles with the downward moving proppant particles, slowing the proppant settling rate which results in a more uniform vertical distribution of proppant in the fracture at closure. In this method the particulate material additive does not require sufficient strength to act as a proppant. The additive may crush on closure of the fracture, and the additive is designed to dissolve over time thereby eliminating proppant pack damage. Also the particulate material comprises polyesters, such as polylactic acid particles, which will hydrolyze and will be swept from the proppant bed with time. Also, the low-density particulate material comprises polylactic acid particles or glass beads. The polyesters comprise polylactic acid particles. In the method disclosed herein, the additive may crush on closure of the fracture. Also, the additive is designed to dissolve over time thereby eliminating proppant pack damage. In the method, the particulate material comprises polyesters, such as polylactic acid, which will hydrolyze and will be swept from the proppant bed with time.

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A method of mitigating proppant settling in a hydraulic fracture, the method comprising the following steps:
   a. providing a proppant-carrier fluid slurry;
   b. adding a low-density particulate material which defines an additive at a concentration of between 1% and 2% by weight of proppant volume to the proppant-carrier fluid slurry, the particulate additive having a specific gravity lower than the specific gravity of the carrier fluid;
   c. providing a proppant having a specific gravity that is greater than that of the carrier fluid;
   d. injecting the proppant-carrier fluid slurry having the low-density particulate material into the fracture;
   e. due to the specific gravity gradient between the particulate material, the proppant-carrier fluid slurry, and the proppant, causing the additive particles to rise in the carrier fluid while the proppant particles fall in the carrier fluid; and
   f. through interference from collisions of the upward moving additive particles with the downward moving proppant particles, slowing the proppant settling rate which results in a more uniform vertical distribution of proppant in the fracture at closure.

2. The method in claim 1, wherein the particulate material additive does not require sufficient strength to act as a proppant.

3. The method in claim 1, wherein the additive may crush on closure of the fracture.

4. The method in claim 1, wherein the additive is designed to dissolve over time thereby eliminating proppant pack damage.

5. The method in claim 1, wherein the particulate material comprises polyesters, which will hydrolyze and will be swept from the proppant bed with time.

6. The method in claim 1, wherein the low-density particulate material comprises polylactic acid particles.

7. The method in claim 1, wherein the low-density particulate material comprises glass beads.

8. The method in claim 5, wherein the polyesters comprise polylactic acid particles.

9. A method of mitigating proppant settling in a hydraulic fracture, the method comprising the following steps:
   a. providing a proppant-carrier fluid slurry;
   b. adding a low-density particulate material which defines an additive at a concentration of 1% to 2% by weight of proppant to the proppant-carrier fluid slurry, the additive having a specific gravity lower than the specific gravity of the carrier fluid;
   c. providing a proppant having a specific gravity that is greater than that of the carrier fluid;
   d. injecting the proppant-carrier fluid slurry having the low-density particulate material into the fracture;
   e. due to the specific gravity gradient between the particulate material, the proppant-carrier fluid slurry, and the proppant, causing the additive particles to rise in the carrier fluid while the proppant particles fall in the carrier fluid; and
   f. through interference from collisions of the upward moving additive particles with the downward moving proppant particles, slowing the proppant settling rate which results in a more uniform vertical distribution of proppant in the fracture at closure.

10. A method of mitigating proppant settling in a hydraulic fracture, the method comprising the following steps:
    a. providing a proppant-carrier fluid slurry;
    b. adding polylactic acid particles as an additive to the proppant-carrier fluid slurry at a concentration of 1% to 2% by weight of proppant, the additive having a specific gravity lower than the specific gravity of the carrier fluid;
    c. providing a proppant having a specific gravity that is greater than that of the carrier fluid;
    d. injecting the proppant-carrier fluid slurry having the low-density particulate material into the fracture;
    e. due to the specific gravity gradient between the particulate material, the proppant-carrier fluid slurry, and the proppant, causing the additive particles to rise in the carrier fluid while the proppant particles fall in the carrier fluid; and
    f. through interference from collisions of the upward moving additive particles with the downward moving proppant particles, slowing the proppant settling rate which results in a more uniform vertical distribution of proppant in the fracture at closure.

* * * * *